(12) United States Patent
Pirim

(10) Patent No.: US 11,164,049 B2
(45) Date of Patent: Nov. 2, 2021

(54) AUTOMATED METHOD AND DEVICE CAPABLE OF PROVIDING DYNAMIC PERCEPTIVE INVARIANCE OF A SPACE-TIME EVENT WITH A VIEW TO EXTRACTING UNIFIED SEMANTIC REPRESENTATIONS THEREFROM

(71) Applicant: ANOTHER BRAIN, Paris (FR)

(72) Inventor: Patrick Pirim, Paris (FR)

(73) Assignee: ANOTHER BRAIN, Paris (FR)

( * ) Notice: Subject to any disclaimer, the term of this patent is extended or adjusted under 35 U.S.C. 154(b) by 122 days.

(21) Appl. No.: 16/499,820

(22) PCT Filed: Apr. 27, 2018

(86) PCT No.: PCT/EP2018/060929
§ 371 (c)(1),
(2) Date: Sep. 30, 2019

(87) PCT Pub. No.: WO2018/197693
PCT Pub. Date: Nov. 1, 2018

(65) Prior Publication Data
US 2020/0104647 A1 Apr. 2, 2020

(30) Foreign Application Priority Data
Apr. 28, 2017 (FR) ...................................... 1700465

(51) Int. Cl.
*G06K 9/52* (2006.01)
*G06F 40/30* (2020.01)
(Continued)

(52) U.S. Cl.
CPC ........... *G06K 9/6272* (2013.01); *G06F 40/30* (2020.01); *G06K 9/3233* (2013.01); *G06K 9/6212* (2013.01); *G06N 5/027* (2013.01)

(58) Field of Classification Search
CPC .. G06K 9/6272; G06K 9/3233; G06K 9/6212; G06K 9/00986; G06K 9/00;
(Continued)

(56) References Cited

U.S. PATENT DOCUMENTS 4,545,067 A * 10/1985 Juvin ........................ G06K 9/48
382/153
2005/0097068 A1 5/2005 Graepel et al.
(Continued)

FOREIGN PATENT DOCUMENTS

EP 1 131 789 A1 9/2001
FR 2 858 447 A1 2/2005
(Continued)

OTHER PUBLICATIONS

Delaye, A. and Anquetil, E., 2013. HBF49 feature set: A first unified baseline for online symbol recognition. Pattern Recognition, 46(1), pp. 117-130.*

(Continued)

*Primary Examiner* — Zhitong Chen
(74) *Attorney, Agent, or Firm* — BakerHostetler

(57) ABSTRACT

Automated method and device suitable for ensuring the dynamic perceptual invariance of an event with a view to extracting therefrom unified semantic representations are provided. The event is perceived by a linguistic data translator that delivers a signal (HD) referenced (x,y), which signal is transformed into a signal (MAP1) referenced (i,j) through a unit (Dec) that carries out a Gaussian filtering operation that is parameterized by w and decimated by a coefficient k, and transformed into a signal (MAP2) referenced (X,Y) representative of the invariant event through a unit (ROI). A unit (71') transforms the signal (MAP1) into a signal of oriented edge (ImBo) and of curvature (ImCb), which are presented to a dynamic attractor (80_0) that (Continued)

statistically transforms this information into a curvature $cb_0$ and average orientation $bo0$, centroid $i0,j0$ and size of the point cloud $ap0,bp0$ in order to supply an invariance-computing unit (Inv), which delivers the parameters w, k and the addresses (X,Y) of the signal (MAP2). The invention is applicable in the neuroscience field as an electronically integratable memory-storage unifier.

11 Claims, 6 Drawing Sheets

(51) Int. Cl.
*G06K 9/32* (2006.01)
*G06K 9/62* (2006.01)
*G06N 5/02* (2006.01)

(58) Field of Classification Search
CPC .... G06K 9/4609; G06K 9/6293; G06F 40/30; G06N 5/027; G06N 3/0445
See application file for complete search history.

(56) References Cited

U.S. PATENT DOCUMENTS

| | | |
|---|---|---|
| 2012/0308136 A1 | 12/2012 | Izhikevich et al. |
| 2015/0227849 A1 | 8/2015 | Jaros et al. |
| 2018/0197285 A1* | 7/2018 | Vinciguerra ............... G06T 7/90 |

FOREIGN PATENT DOCUMENTS

| | | | |
|---|---|---|---|
| FR | 2884625 A1 * | 10/2006 | ........... G05D 1/0246 |
| WO | 01/22366 A1 | 3/2001 | |
| WO | 02/069265 A1 | 9/2002 | |

OTHER PUBLICATIONS

Shen, Y. and Foroosh, H., Jun. 2008, View-invariant action recognition using fundamental ratios. In 2008 IEEE Conference on Computer Vision and Pattern Recognition (pp. 1-6). IEEE.*
Pirim, et al., "Perceptive Invariance and Associative Memory Between Perception and Semantic Representation, USER a Universal Semantic Representation Implemented in a System on Chip (SoC)", Network and Parallel Computing, pp. 275-287, Jul. 12, 2016.

* cited by examiner

AUTOMATED METHOD AND DEVICE CAPABLE OF PROVIDING DYNAMIC PERCEPTIVE INVARIANCE OF A SPACE-TIME EVENT WITH A VIEW TO EXTRACTING UNIFIED SEMANTIC REPRESENTATIONS THEREFROM

CROSS-REFERENCE TO RELATED APPLICATIONS

This application is a National Stage of International patent application PCT/EP2018/060929, filed on Apr. 27, 2018, which claims priority to foreign French patent application No. FR 1700465, filed on Apr. 28, 2017, the disclosures of which are incorporated by reference in their entirety.

FIELD OF THE INVENTION

The present invention relates to an automated device and method able to ensure the perceptual invariance of a spatial-temporal event dynamically with a view to extracting therefrom unified semantic representations and storing them in memory in association with a specific label. It also relates to a simplified memory-storage system for training networks of neuronal populations.

The invention makes it possible to ensure a bijective relationship between the space of the event, its contextual representation and its eigen-representation.

The invention is in particular applicable to the simplification of the processing of neuronal populations implemented on-silicon for the analysis of various signals, including multidimensional signals such as the semantic representation of perception of images, of sound or of other independently or simultaneously perceived modalities for example.

BACKGROUND

Human memory is fundamentally associative: we remember better when we are able to link the new information to knowledge that has already been acquired and that is solidly anchored in our memory. Furthermore, the greater the meaning it has for us, the more effective this link will be. Rather than simple recall of fixed impressions, memory is therefore at the present time considered to be a continual process of re-categorization stemming from a continuous change in antagonistic neuronal pathways and from parallel processing of information in the brain. Perceptual invariance simplifies the categorization to be stored in memory, a single representation being written thereto. The recall of an event, of a scene or of an object makes use of the inverse invariance function, replacing the information stored in memory in context.

This technique is catching up with what evolution has taken thousands of years to achieve. The following three patents are representative of the prior art:

Patent US2005097068 titled "invariant pattern recognition" published 5 May 2015 describes a non-linear invariance transformation for training an effective classifier that satisfactorily recognizes models, even in the presence of known transformations that do not modify the class of the pattern.

Patent US2012308136 titled "apparatus and methods for pulse-code invariant object recognition" published 6 Dec. 2012 describes a bio-inspired method based on action potential. The information is encoded in one variant as a pattern of pulse latencies with respect to an occurrence of a temporal event; for example, the appearance of a new visual context or of a movement of the image. The pattern of the pulses is advantageously substantially insensitive to image parameters such as size, position and orientation, so that the identity of the image may be easily decoded.

Patent US2015227849 titled "apparatus and methods for invariant pattern recognition" uses a new factorization of a third-order Boltzmann machine that employs multilayer unsupervised training of arbitrary transformations and that trains functionalities that are rich and complex even in the absence of marked data. These characteristics are then used to classify unknown input models, in order to achieve a decrease in dimension or compression.

All these approaches to perceptual invariance do not allow a unified association storage mechanism and concomitant operation in the two directions (bottom-up and top-down) that exist in human memory while allowing information to be dynamically looped. Furthermore, the elements stored in memory are not simply transferable from one medium to another, because they are non-invariant.

Another approach has been suggested by P. Pirim, the author of the present invention, with the aim of overcoming these drawbacks, in a publication: "Perceptive Invariance and Associative Memory Between Perception and Semantic Representation, USER a Universal Semantic Representation Implemented in a System on Chip (SoC)" published in Living Machines 2016, LNAI 9793, pp. 275-287, 2016. This first succinct approach has been followed by many improvements, which are described in this invention. The aim of the perceptual-invariance method of the invention is to generate only a single semantic representation of the perceived element in order to optimize the amount of information stored therefor and to be able to recall the content thereof out or in its context. The associated device of the invention is based on the automatic edge and curvature perception described in patent FR2858447, the inventor of which is the same as that of the present application, the title of this patent being "procédé et dispositif automatisé de perception avec détermination et caractérisation de bords et de frontiéres d'objets, d'un espace, construction de contours et applications". In this patent, digital signals represented by parameters of the objects of a space are analyzed via a set of elementary units or modules for computing histograms of same type, which are bilinear at the present time and called "dynamic attractors". This device allows various processes to be integrated into an electronic component.

SUMMARY OF THE INVENTION

The invention therefore relates to an automated method able to compute the perceptual invariance of an event occurring in a space, represented by pixels together forming a multidimensional space x,y, that varies over time at a succession of moments T, said data, each associated with a temporal parameter A, B, . . . , taking the form of digital signals DATA(A), DATA(B), . . . consisting of a sequence $A_{xyt}$, $B_{xyt}$, . . . of binary numbers of a bits associated with synchronization signals allowing the moment T of the space and the position x,y in this space, at which the signals $A_{xyt}$, $B_{xyt}$, . . . received at a given instant to be defined, with respect to at least one parameter for the computation of the invariance of said event; according to the invention:

a) a change of scale of factor k is carried out in a parameterizable way on the space x,y during a moment T, b) a computation for elementary extraction of oriented edges and of associated curvature is carried out on the basis of the results of the change of scale of the preceding step in the space i=x/k, j=y/k during the same moment T, c) a computation of a looped bilinear spatial-temporal histogram is carried out on the basis of the elementary oriented-edge and associated-curvature results computed beforehand, in order to locate thereby a region of interest of the event-related space, and, depending on statistical curvature and oriented-edge criteria applied to a spatial parameter, in order to obtain therefrom, for the region of interest thus located, at the end of the moment T:
  a. a median value of oriented edge $bo_0$ and of curvature $cb_0$,
  b. a value of the position of the centroid of the point cloud $i_0$, $j_0$,
  c. a dimensional value of the point cloud $ap_0$, $bp_0$, d) if necessary, a computation of the parameter k is carried out depending on the median curvature value $cb_0$ defined in the preceding step, e) if necessary, an automatic control is carried out, by iteration at the end of moment T, by update of the parameters of the change of scale k in step a), in order to keep the median curvature value $cb_0$ between two increasing limits La and Lb, f) a region of interest in the upstream coordinate system x,y is selected, before the change of scale k, by attributing thereto a coordinate system X, Y, such that these new coordinates are defined depending on the old coordinates x, y, by a geometric translation of origin $k.i_0$, $k.j_0$ and a rotation of the coordinate system by an angle $bo_0$, such that:

$$\begin{bmatrix} X \\ Y \end{bmatrix} = \begin{bmatrix} \cos(bo_0) & -\sin(bo_0) \\ \sin(bo_0) & \cos(bo_0) \end{bmatrix} \times \begin{bmatrix} x - k \cdot i_0 \\ y - k \cdot j_0 \end{bmatrix}$$

with $-k.ap_0 \leq X < k.ap_0$ and $-k.bp_0 \leq Y < k.bp_0$ g) the scale of this region of interest is adapted so that it fits in a centered square of $2^z$ pixels side length, the number of bits u forming the largest range $k.ap_0$ or $k.bp_0$ being truncated in order to preserve only the z most significant bits of this range. The ratio $1/2^{(u-z)}$ forms the homothetic ratio, h) the data defined in this square of $2^z$ pixels side length and of coordinate system $X1 = X \cdot 1/2^{(u-z)}$, $Y1 = Y \cdot 1/2^{(u-z)}$ is used with a view to extracting therefrom and recognizing invariant elementary semantic representations of said event, the change of scale of factor k is carried out in a parameterizable way via a computation of a Gaussian filtering operation of size 2w+1, the value w being the parameter of the filtering matrix, in association with a decimation function of factor k, on the space x, y during a moment Ti, a computation of the parameters w and k is carried out depending on the median curvature value $cb_0$ defined in the preceding step d), by comparing the new medium curvature value $cb_0$ to two limits of increasing values La and Lb, for $0 \leq w \leq w\_max$, such that:
  a) $cb_0 < La$ the value of w is increased by one unit. Flag Val=0
  b) $La \leq cb_0 \leq Lb$ the value of W remains unchanged. Flag Val=1
  c) $cb_0 > Lb$ the value of w is decreased by one unit. Flag Val=0 d) An affine function of the parameter w recomputes the value k, such that k=0.81w+1.09, an automatic control by iteration, at the end of each moment T, is carried out of an update of the Gaussian filtering parameter w and decimation parameter k in step a) in order to keep the median curvature value $cb_0$ between two increasing limits La and Lb, the change of scale of factor k is carried out in a parameterizable way using a dedicated sensor on the space x, y during a moment Ti, a region of interest is selected in the upstream coordinate system x, y, using a dedicated sensor in the space x, y during a moment T, by attributing thereto a region of $k.ap_0$ by $k.bp_0$ size in a coordinate system X, Y, of this space x,y, such that these new coordinates are defined, depending on the old coordinates x, y, by a geometric translation of origin $k.i_0$, $k.j_0$, a rotation of the coordinate system by an angle $bo_0$, and a homothetic ratio $1/2^{(u-z)}$, in order to extract and recognize invariant elementary semantic representations of said event on the basis of data defined in this square of $2^z$ pixels side length, a) each of these data are transformed into global, dynamic and structural type, these data being positioned in the coordinate system X1, Y1, b) a computation of a looped bilinear spatial-temporal histogram is carried out on the basis of the elementary results of global, dynamic and structural type, which results are positioned in the coordinate system X1, Y1 and were computed beforehand, in order to locate thereby a region of interest integrated into a square of $2^z$ side-length dimension of the space, representing one portion of the event, depending on global, dynamic and structural statistical criteria of a spatial parameter of coordinate system X1, Y1, in order to obtain therefrom, for the region of interest thus located, at the end of moment T, at least, a structural semantic representation:
  a. a median value of oriented edge $bo_1$ and of curvature $cb_1$,
  b. a value of the position of the centroid of the point cloud $i_1$, $j_1$,
  c. a dimensional value of the point cloud $ap_1$, $bp_1$, c) a new computation of a looped bilinear spatial-temporal histogram is re-iterated, while inhibiting the information of the precedingly located main regions so as to locate other regions of interest inside a region of the uninhibited square space of $2^z$ side length, until n computational sequences have been carried out or indeed until an uninhibited remaining region of this space produces no more regions corresponding to said statistical criterion, in order to obtain therefrom, for the region of interest thus located, at the end of moment T, at least, a structural semantic representation:
  a. a median value of oriented edge $bo_1$ and of curvature $cb_n$,
  b. a value of the position of the centroid of the point cloud $i_n$, $j_n$,
  c. a dimensional value of the point cloud $ap_n$, $bp_n$, d) all these elementary-semantic-representation values are transmitted to an associative memory with a view to a label recognition.

The invention also relates to an automatic device for computing the perceptual invariance of an event occurring in a space, represented by pixels together forming a multidimensional space x, y, that varies over time at a succession of moments T, said data, each associated with a temporal parameter A, B, . . . , taking the form of digital signals DATA(A), DATA(B), . . . consisting of a sequence Axyt, Bxyt, . . . of binary numbers of a bits associated with synchronization signals allowing the moment T of the space and the position x, y in this space, at which the signals Axyt, Bxyt, . . . received at a given instant to be defined, with respect to at least one parameter for the computation of the invariance of said event. The automatic device for computing perceptual invariance according to the invention comprises:

a) a unit for computing a change of scale of factor k on the space x, y during a moment T,
b) a unit for computing elementary extraction of oriented edges and of associated curvature on the basis of the results of the change of scale of the preceding step in the space i=x/k, j=y/k during the same moment T,
c) a unit for computing a looped bilinear spatial-temporal histogram on the basis of the elementary oriented-edge and associated-curvature results computed beforehand, in order to locate thereby a region of interest of the event-related space, and, depending on statistical curvature and oriented-edge criteria applied to a spatial parameter, in order to obtain therefrom, for the region of interest thus located, at the end of the moment T:
  a. a median value of oriented edge $bo_0$ and of curvature $cb_0$,
  b. a value of the position of the centroid of the point cloud $i_0$, $j_0$,
  c. a dimensional value of the point cloud $ap_0$, $bp_0$,
d) a unit for computing the parameter k depending on the median curvature value $cb_0$ defined in the preceding step, which is employed where necessary,
e) a unit for computing an automatic control, which unit is employed where necessary, by iteration at the end of each moment T, by update of the parameters of the change of scale k in step a), in order to keep the median curvature value $cb_0$ between two increasing limits La and Lb,
f) a unit for selecting a region of interest in the coordinate system x, y upstream of the change of scale k, by attributing thereto a coordinate system X, Y, such that these new coordinates are defined depending on the old coordinates x, y, by a geometric translation of origin $k.i_0$, $k.j_0$ and a rotation of the coordinate system by an angle $bo_0$, such that:

$$\begin{bmatrix} X \\ Y \end{bmatrix} = \begin{bmatrix} \cos(bo_0) & -\sin(bo_0) \\ \sin(bo_0) & \cos(bo_0) \end{bmatrix} \times \begin{bmatrix} x - k \cdot i_0 \\ y - k \cdot j_0 \end{bmatrix}$$

with $-k.ap_0 \leq X < k.ap_0$ and $-k.bp_0 \leq Y < k.bp_0$
g) a unit for adapting the scale of this region of interest so that it fits in a centered square of $2^z$ pixels side length, the number of bits u forming the largest range $k.ap_0$ or $k.bp_0$ being truncated in order to preserve only the z most significant bits of this range. The ratio $1/2^{(u-z)}$ forms the homothetic ratio,
h) a port for outputting these data defined in this square of $2^z$ pixels side length and of coordinate system $X1=X.1/2^{(u-z)}$, $Y1=Y.1/2^{(u-z)}$ with a view to extracting therefrom and recognizing invariant elementary semantic representations of said event.

It comprises, in a parameterizable way, the unit for computing change of scale of factor k consists of a computation of a Gaussian filtering operation of size 2w+1, the value w being the parameter of the filtering matrix, in association with an affine function of the parameter w of decimation of factor k, on the space x, y during a moment T, It comprises, the unit for computing the parameters w and k depends on the median curvature value $cb_0$ defined in the preceding step d), the new medium curvature value $cb_0$ being compared to two limits of increasing values La and Lb, for $0 \leq w \leq w\_max$, such that:
  a) $cb_0$<La the value of w is increased by one unit. Flag Val=0
  b) La$\leq cb_0 \leq$Lb the value of w remains unchanged. Flag Val=1
  c) $cb_0$>Lb the value of w is decreased by one unit. Flag Val=0
  d) An affine function of the parameter w recomputes the value k, such that k=0.81w+1.09.

It comprises, the unit for computing an automatic control by iteration, at the end of each moment T, updates of the Gaussian filtering parameter w and decimation parameter k in step a) in order to keep the median curvature value $cb_0$ between two increasing limits La and Lb.

It comprises, the unit for carrying out the change of scale of factor k, in a parameterizable way, is achieved using a dedicated sensor on the space x, y during a moment T.

It comprises, the unit for selecting a region of interest in the upstream coordinate system x, y, is formed using a dedicated sensor in the space x, y during a dataframe sequence, by attributing thereto a region of $k.ap_0$ by $k.bp_0$ size in a coordinate system X, Y, of this space x,y, such that these new coordinates are defined, depending on the old coordinates x, y, by a geometric translation of origin $k.i_0$, $k.j_0$, a rotation of the coordinate system by an angle $bo_0$, and a homothetic ratio $1/2^{(u-z)}$.

It comprises, in order to extract and recognize invariant elementary semantic representations of said event on the basis of data defined in this square of $2^z$ pixels side length, the following are employed:
  a) a linguistically translating unit that transforms each of these data into global, dynamic and structural type, these data being positioned in the coordinate system X1, Y1,
  b) a unit for computing a looped bilinear spatial-temporal histogram, which carries out computations, on the basis of the elementary results of global, dynamic and structural type, which results are positioned in the coordinate system X1, Y1 and were computed beforehand, in order to locate thereby a region of interest integrated into a square of $2^z$ side-length dimension of the space, representing one portion of the event, depending on global, dynamic and structural statistical criteria of a spatial parameter of coordinate system X1, Y1, in order to obtain therefrom, for the region of interest thus located, at the end of moment T, at least, a structural semantic representation:
    a. a median value of oriented edge $bo_1$ and of curvature $cb_1$,
    b. a value of the position of the centroid of the point cloud $i_1$, $j_1$,
    c. a dimensional value of the point cloud $ap_1$, $bp_1$,
  c) the introduction of new units for computing a looped bilinear spatial-temporal histogram is re-reiterated, while inhibiting the information of the precedingly located main regions so as to locate other regions of interest inside a region of the uninhibited square space of $2^z$ side length, until n computational sequences have been carried out or indeed until an uninhibited remaining region of this space produces no more regions corresponding to said statistical criterion, in order to obtain therefrom, for the region of interest thus located, at the end of moment T, at least, a structural semantic representation:
   a. a median value of oriented edge $bo_n$ and of curvature $cb_n$,
   b. a value of the position of the centroid of the point cloud $i_n$, $j_n$,
   c. a dimensional value of the point cloud $ap_n$, $bp_n$,
d) An output port that transmits all these elementary-semantic-representation values to an associative memory with a view to a label recognition.

In use, the device comprises memory means for associatively storing the semantic representation ensuring the invariance and its associated label, the label representing the event in a unified way, and the representation of the located region of interest, and its context.

BRIEF DESCRIPTION OF THE DRAWINGS

The present invention will now be described by way of the following nonlimiting description and with reference to the following figures.

DETAILED DESCRIPTION

Figure 1:
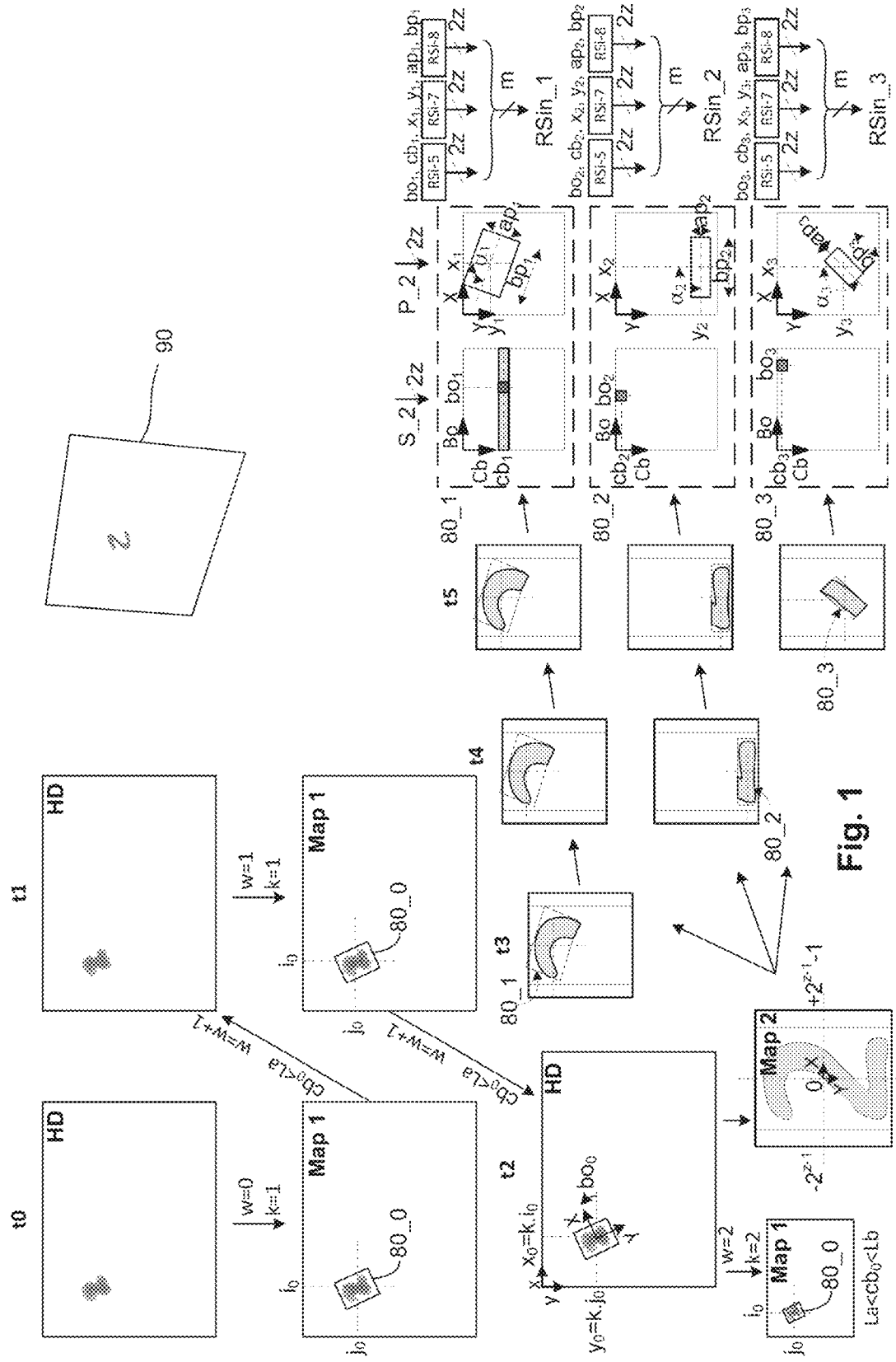
FIG. 1 is a representation, in its generality, of the automated perceptual-invariance method allowing invariant extraction of perceived semantic representations of the event in its context according to the invention.

FIG. 1 describes the generic perceptual-invariance method on the basis of an example of dynamic management, in sequences, of the interaction between the event (signal (HD) referenced (x,y)) its context (signal (MAP1) referenced (i,j)) and its representation (signal (MAP2) referenced (X,Y)).

The event (90), which occurs in a space with respect to at least one parameter, which consists in digitizing it and delivering it as input to a unit for computing perceptual invariance and deducing therefrom the desired result, is described by a datastream $a_{(x,y,t)}$ associated with pixels together forming a multidimensional space that varies over time and that is represented at a succession of moments T, the data reaching the computing unit in the form of a digital signal (HD) taking the form of a sequence $a_{(x,y,t)}$ of binary numbers of a bits, which signal is associated with synchronization signals making it possible to define the given moment T of the space and the position of the pixel in this space, modified by a two-dimensional filtering unit that performs a Gaussian filtering operation that is of size 2w+1, parameterized by the value w, and decimated in the two dimensions by a value k, which is an affine function of the parameter w, (k=0.81w+1.09). This result defines a two-dimensional data stream (MAP1) of identical moment T to the preceding stream.

A first moment T starts at the time (t0) with the representation of the event in its context, which must be global, as a convex uniform region of sufficient general curvature ($cb_0$). The filtering parameter w, which is equal to zero, defines the output stream (MAP1) that is analyzed, a computation of looped bilinear histograms corresponding to a dynamic attractor (80_0), and, at the end of the moment T, a curvature value ($cb_0$) is deduced therefrom. This curvature value ($cb_0$) is compared to two limits of increasing values La and Lb, for $0 \leq w \leq w\_max$:

$cb_0$<La the value of w is increased by one unit. Flag Val=0
La$\leq cb_0 \leq$Lb the value of W remains unchanged. Flag Val=1
$cb_0$>Lb the value of w is decreased by one unit. Flag Val=0

The associated values of w and k are updated for the following moment T.

At the following moment T (t1), a Gaussian filtering operation is carried out using a 3×3 matrix (w=1) and k=1. The result ($cb_0$<La) leads to an increase in the value of w by one unit and k takes the value 2.

The following moment T (t2) starts with w=2 and k=2, forcing Gaussian smoothing to be carried out by convolution of a 5×5 Gaussian matrix with the data and a decimation by 2 of the output stream (MAP1). The result $cb_0$, which is comprised between the two limits La and Lb, keeps the value w at 2, sets the flag Val to one and triggers the computation of the invariant stream (MAP2), which is of $2^z \times 2^z$ size and equal to:

A geometric translation of the center point $x_0 = k.i_0$ and $y_0 = k.j_0$ in the frame (HD)
A rotation, at this center point, of the coordinates by an angle equal to $bo_0$
A homothetic transformation corresponding to the largest dimension of the region of interest of the dynamic attractor ($ap_0$) or ($bp_0$) multiplied by the value of the decimation coefficient (k) and scaled by the validation of the first z bits of the preceding result.

This convergence having stabilized, signaled by the flag Val being set to 1, the rest of the moments T (t3) to (t5) employ dynamic attractors recruited by dynamic recruitment in order to obtain, for the region of interest thus located, at the end of the moment T, a structural semantic representation, while inhibiting the information of the main regions located beforehand, so as to locate other regions of interest inside a region of the uninhibited square space of $2^z$ side length.

The first dynamic attractor (80_1) at the moment T (t3) focuses on the combination of the most important points, here the curvature $cb_1$ and its orientation $bo_1$ of numeral "2", its position $x_1$, $y_1$ and its dimension $ap_1$, $bp_1$, then, while inhibiting the information of the main region located beforehand, at moment T (t4), a second dynamic attractor (80_2) extracts its horizontal basis, curvature $cb_2$ and its orientation $bo_2$, its position $x_2$, $y_2$ and its dimension $ap_2$, $bp_2$, the first dynamic attractor remaining applied and lastly, at moment T (t5), a third dynamic attractor (80_3) extracts its oblique curvature portion $cb_3$ and its orientation $bo_3$, its position $x_3$, $y_3$ and its dimension $ap_3$, $bp_3$.

When the remaining region of numeral "2" (uninhibited) of this space produces no more regions corresponding to said statistical criteria, the succession stops and the results (RSin_1), (RSin_2), and (RSin_3) respectively of the three dynamic attractors (80_1), (80_2) and (80_3) corresponding to the message MEin is introduced into the associative memory (10) in order to deliver thereby the label "two".

Figure 2:
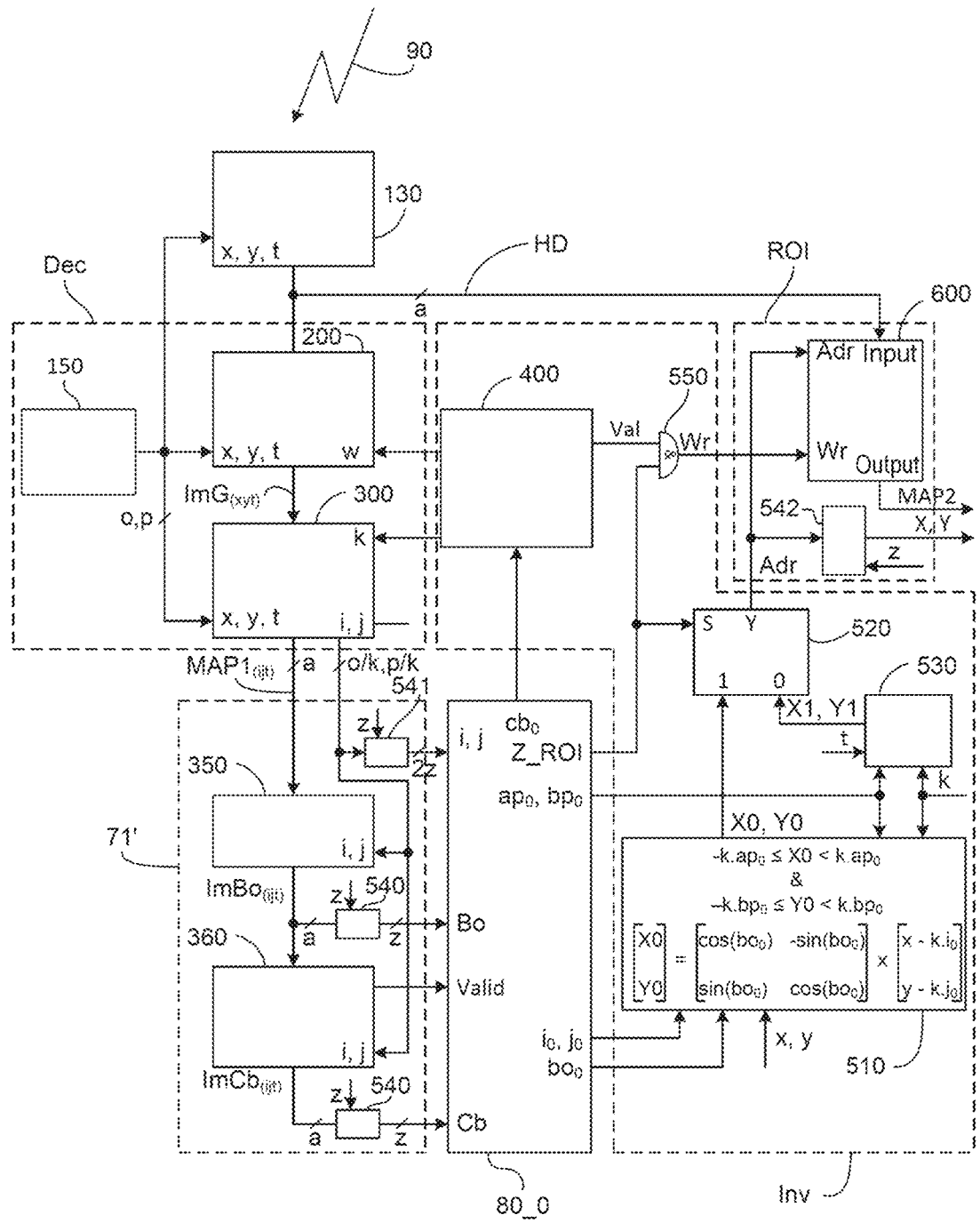
FIG. 2 is a representation, in its generality, of the perceptual-invariance device according to the invention.

FIG. 2 shows the perceptual-invariance device in association with the method described above with reference to FIG. 1, and comprises the following units:

The linguistically translating unit (130)

An event (90) is perceived by a linguistic translator (130) that delivers a datastream ($HD_{xyt}$) the data of which are associated with pixels together forming a multidimensional space that varies over time and that is represented at a succession of moments T, said data, each associated with a temporal parameter HD, taking the form of digital signals DATA(HD) consisting of a sequence ($HD_{xyt}$) of binary numbers of a bits that are synchronized by a clock (Ck) and the positions x, y, of dimensions respectively of o and p bits, of a data sequencer (150). This stream ($HD_{xyt}$) is connected to the input of a Gaussian filtering unit (200) and to the input of a buffer memory (600).

The decimating unit (Dec) is composed:
of a data-sequencing unit (150) that generates the addresses x and y and signals for synchronizing the data of this decimating unit (Dec),
of a Gaussian filtering unit (200) that is synchronized by a clock (Ck) and the positions x, y of a data sequencer (150) and that is parameterized by the filtering value (w). This unit applies a two-dimensional filtering function of Gaussian type by convolution of a Gaussian matrix of 2w+1 size with the input data, the result being a stream $ImG_{(xyt)}$ of two-dimensional data delivered in sequence to a decimating unit (300),
of a decimating unit (300) that receives the input stream $ImG_{(xyt)}$ and delivers as output the stream $MAP1_{(ijt)}$ of two-dimensional data to the unit for computing oriented edges (350), while selecting, depending on the two dimensions x and y, one element every k elements. For example, for k equal to 1, all the elements are selected, for k equal to 2, it is one in two consecutive elements that are selected in the two dimensions, the sequence therefore delivering four times less data than received, and so on for increasing k. This unit generates a new sequence of position i, j such that i=x/k and j=y/k.

The converting unit (71') is composed:
of a unit for computing oriented edges (350) that transforms each input datum, coded over a bits (position i,j), of the stream into an angular value Bo (position i,j) corresponding to the presence of an edge signaled by the flag (Valid) being set to 1 or into a neutral value in the contrary case (flag (Valid) set to 0). These values form the stream ImBo(ijt) coded over a bits,
of a unit for computing curvature (360), which receives the stream ImBo(ijt), in order to compute therefrom a notion of curvature (Cb) (position i,j) corresponding to found local angular variations or into a neutral value in the contrary case (flag (Valid) set to 0). These values form the stream ImCb (ijt) coded over a bits,
The association of these two streams ImBo(ijt), ImCb(ijt), each truncated from a bits to z most significant bits by a unit (540), forms the two-dimensional structural stream input into the dynamic attractor (80_0).

The spatial stream (i, j) in association, of amplitude xmax/k and ymax/k and of o/k and p/k bits respectively, is truncated by u bits corresponding to the number of bits forming the highest value o/k or p/k minus the z most significant bits, and forms the spatial two-dimensional stream input into the dynamic attractor (80_0).

The dynamic attractor (80_0)

Figure 3:
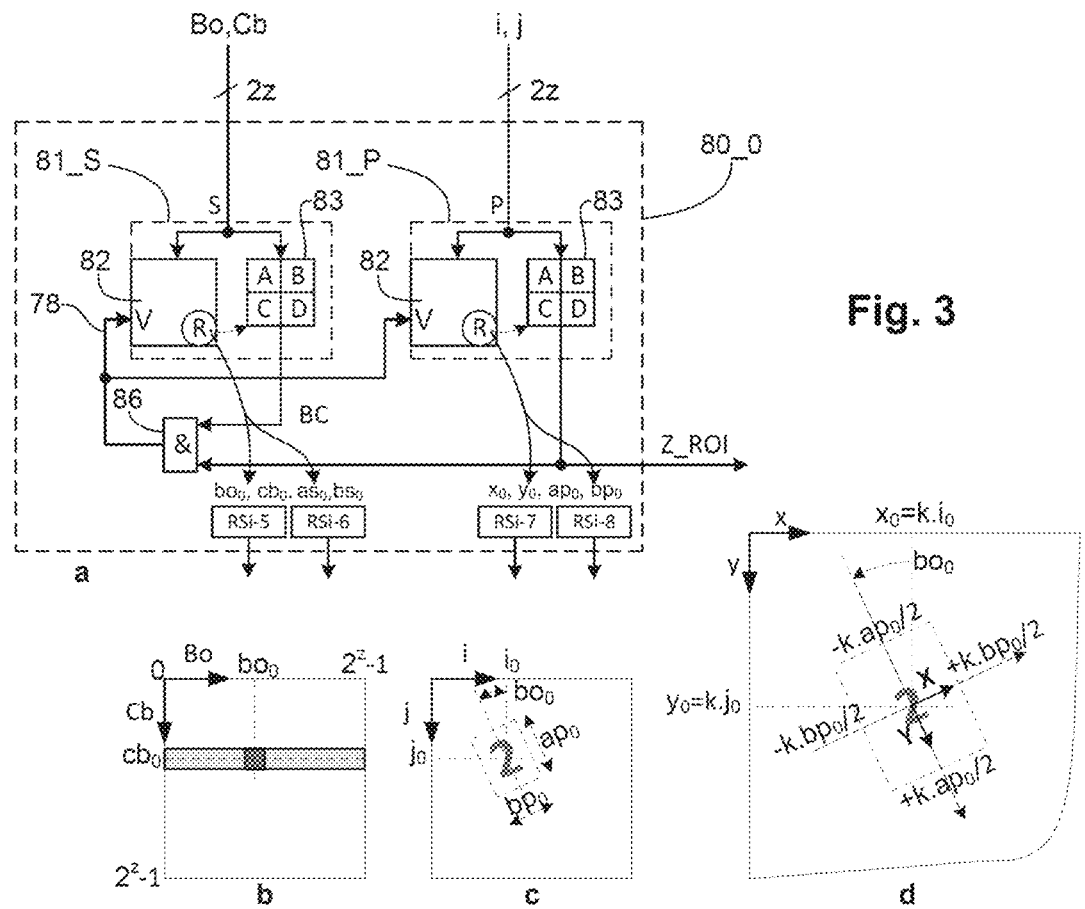
FIG. 3 is a detailed illustration of the process of computation of the parameters allowing the perceptual invariance via use of a dynamic attractor.

The dynamic attractor (80_0), which is more precisely described in FIG. 3, computes spatial-temporal two-dimensional histograms at each validated elementary moment (flag (Valid) set to 1) from the pairs of instantaneous truncated data i, j, and Bo, Cb, each pair comprising 2z bits by way of a set allowing a computation of spatial-temporal two-dimensional histograms that delivers, at the end of the moment T, a result (if the element is present):
a position of the centroid of the element $i_0$, $j_0$, and a binary signal of region Z_ROI,
a dimension of the point cloud $ap_0$, $bp_0$ and its spatial representation (Z_ROI), and
a general orientation $bo_0$ and general curvature $cb_0$.

The unit (Inv) for computing perceptual invariance comprises:
A unit (400) for computing a Gaussian filtering operation parameterized using the value (w), which receives, at the end of the moment T, the new general curvature value ($cb_0$), which is compared to two limits of increasing values La and Lb, for 0≤w≤w_max:
  $cb_0$<La the value of w is increased by one unit. Flag Val=0
  La≤$cb_0$≤Lb the value of W remains unchanged. Flag Val=1
  $cb_0$>Lb the value of w is decreased by one unit. Flag Val=0
An affine function of the parameter w recomputes the value k (k=0.81w+1.09). The associated values of w and k are transmitted for the following moment T, (w) to the unit (200) and (k) to the unit (300).

A unit (510) for selecting the region of interest, which receives the coordinates of the centroid $i_0$, $j_0$, the decimation coefficient k, the angular orientation $bo_0$, and the coordinates x, y of the stream ($HD_{(xyt)}$), and computes therefrom new coordinates X0, Y0 using the function:

$$\begin{bmatrix} X \\ Y \end{bmatrix} = \begin{bmatrix} \cos(bo_0) & -\sin(bo_0) \\ \sin(bo_0) & \cos(bo_0) \end{bmatrix} \times \begin{bmatrix} x - k \cdot i_0 \\ y - k \cdot j_0 \end{bmatrix}$$

with $-k \cdot ap_0 \leq X < k \cdot ap_0$ and $-k \cdot bp_0 \leq Y < k \cdot bp_0$ An address multiplexer (520), which transfers the addresses computed beforehand, for the valid region of interest (Z_ROI), to the address port of the buffer memory (600). This signal (Z_ROI), which is validated by the signal Val valid (Boolean AND (550)) corresponding to a correct decimation value, serves to control the write (Wr) to the buffer memory (600) for the data of the stream ($HD_{(xyt)}$) that are delivered to its input port (In).

A memory address sequencer (530) generates a stream of addresses X1, Y1 that passes through the address multiplexer (520) and will serve for the sequential read-out of the buffer memory (600) by way of data stream (MAP2), outside of the time required to write to a range corresponding to $X_1 = k \cdot ap_0$ and $Y_1 = k \cdot bp_0$.

The ROI unit comprises:
A scaling unit (542) that truncates the values X1 and Y1 to the z most significant bits in order to generate an address X and Y each in a range of $2^z$ values, corresponding to the size of the square of $2^z$ side length.

The datastream (MAP2) obtained from the read-out of the memory (600) in address X, Y, corresponding to invariant information of the perceived element.

FIG. 3a describes the process of computing parameters that allow the perceptual invariance to be computed using a dynamic attractor (80_0) consisting of two sets of units for computing bilinear histograms (81_S) and (81_P) that receive the signals and that each produce a classification value the product (V) of which serves to validate the computations:
- the first sub-assembly (81_S) that receives two signals carrying temporal parameters Bo, Cb, and
- the second sub-assembly (81_P) that receives two spatial signals i, j,
- the classification value of the first sub-assembly (83) that validates a group of points of the space processed by this sub-assembly, the number of said points being n1, which number must be higher than a threshold value in order to be taken into account,
- the classification value of the second sub-assembly (83) that validates the values of parameters processed by this second sub-assembly,
- the two sub-assemblies that conjointly produce a binary signal Z_ROI representing a region of interest and a binary signal BC representing the value of the temporal parameter of this region,
- an AND operator 86 that combines the output binary signals Z_ROI and BC, the output of this operator serving as a signal (78) for validating the computations of the sets of units for computing bilinear histograms,
- an external sequencer that initializes the memories of these sets of units for computing bilinear histograms at the start of the moment T, that then validates the computation during the moment T, in order to locate a region of interest of the event-related space, depending on statistical curvature and oriented-edge criteria applied to a spatial parameter and that, at the end of the moment T, obtains, for the region of interest thus located:
  a) a median value of oriented edge $bo_0$ and of curvature $cb_0$,
  b) a value of the position of the centroid of the point cloud $i_0$, $j_0$,
  c) a dimensional value of the point cloud $ap_0$, $bp_0$,
- a series of memory registers (RSi-5) to (RSi-8) that store in memory these obtained values in order to preserve the validity of this information during the moment T+1 with a view to a future use.

Each set (81_S) and (81_P) of units for computing bilinear histograms comprises:
- An analyzing memory unit (82) comprising memories with addresses, each associated with possible values of the numbers of $2.2^z$ bits of the signal (Bo,Cb for the unit (81_S) and i,j for the unit (81_P)) and to which the write is controlled by a signal "Write",
- A classifying unit (83) that, for the unit (81_S), comprises a memory intended to receive the selection criteria A, B, C, D of the parameters Bo,Cb, that receives the parameters Bo,Cb as input and that delivers, as output, a binary classification signal the value of which depends on the result of the comparison of the signal Bo with the selection criteria A, B and of the signal Cb with the criteria selection criteria C, D. For the unit (81_P), the classifying unit (83) works in the same way with the parameters Bo,Cb replaced by i,j. The binary classification signal is validated if the first parameter is comprised between the criteria A and B, and, at the same time, if the second parameter is comprised between the criteria C and D,
- An update of the classifying unit (83), by write to memory of the criteria A, B, C, D, by analysis, at the end of the moment T, of the elements computed by the histogram memory for a sufficient level of the value n1.

FIG. 3b shows the structural result of the element computed by the spatial-temporal bilinear histograms during the moment T. The pair of parameters Bo and Cb form a 2D representation, with as origin the top left-hand corner of a horizontal square of dimension $2^z-1$, Bo on one axis and Cb on the other axis. A vertical third axis represents the sum of each pair. The maximum sum is represented by the pair of values $bo_0$, $cb_0$.

FIG. 3c shows the spatial result of the element computed by the spatial-temporal bilinear histograms during the moment T. The pair of parameters i and j form a 2D representation, with as origin the top left-hand corner of a horizontal square of dimension $2^z-1$, i on one axis and j on the other axis. A vertical third axis represents the sum of each pair. The maximum sum is represented by the pair of values $i_0$, $j_0$. The spatial range of the element has dimensions $ap0$ and $bp0$ centered on $i_0$, $j_0$ and oriented by an angle equal to $bo_0$ centered on $i_0$, $j_0$.

FIG. 3d shows the region of interest (ROI)—spatial result of the element computed beforehand in the upstream coordinate system x,y. The range of the region of interest ROI of the element has dimensions $k.ap_0$ and $k.bp_0$ centered on $x=k.i_0$, $y=k.j_0$ and oriented by an angle equal to $bo_0$ centered on $x=k.i_0$, $y=k.j_0$. The data of this region of interest ROI are defined with the coordinates X and Y (origin at the center of the region of interest and dimensions $-k.ap_0 \leq X < k.ap_0$ and $-k.bp_0 \leq Y < k.bp_0$).

Figure 4:
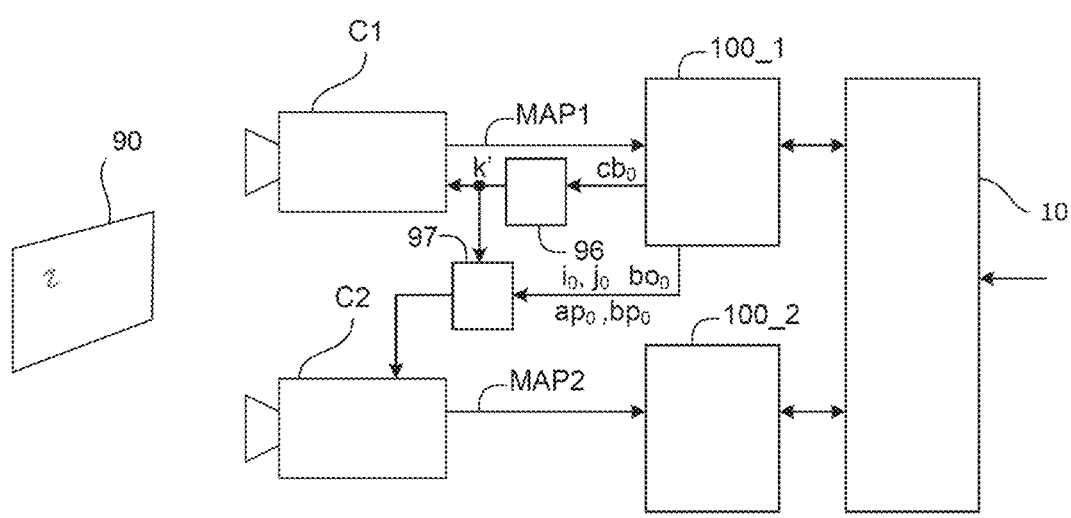
FIG. 4 shows an application integrating visual perceptual invariance via opto-mechanical implementation of two visual sensors.

FIG. 4 illustrates a generic device for achieving perceptual invariance of an event (90) using two coupled cameras, a first camera C1 that outputs a signal MAP1 of low resolution associated with pixels together forming a multidimensional space that varies over time and that is represented at a succession of moments T, in a large field, and a second camera C2, which is movable with respect to the first and of high resolution in a narrow field, and that outputs a signal MAP2 associated with pixels together forming a multidimensional space that varies over time and that is represented at a succession of moments T. A first unit (100_1) for semantically representing a label, which unit is shown in detail in FIG. 6, receives the signal MAP1 and a second unit (100_2) for semantically representing a label receives the signal MAP2, the label-information outputs of each unit (100_1) and (100_2) for semantically representing a label being connected to an associative memory (10) that obtains therefrom information representing the event in its context.

The event perceived by the camera C1 is analyzed globally by the unit (100_1) for semantically representing a label, which thereby delivers information
- on general curvature $cb_0$ to an effector (96) that deduces therefrom a zoom coefficient k', and
- on central position $i_0$, $j_0$, with the dimensions $ap_0$ and $bp_0$ and orientation of the region of interest $bo_0$ including the event in the perceived basic coordinate system.

This information, and the value k', are transmitted to an effector (97), which controls the placement and the magnification of the camera C2, so that its optical axis points to the center of the region of interest, so that the magnification is suitable for the size of said region of interest, and so that the main axis perpendicular to the optical axis is turned by an angle corresponding to the delivered oriented-edge value.

The event perceived by the camera C2 is analyzed in detail, by way of invariant event, by the unit (100_2) for semantically representing a label that, in sequence, deduces therefrom elementary semantic representations characterizing the event, which are presented to an associative memory with a view to recognizing a label thereof.

Figure 5:
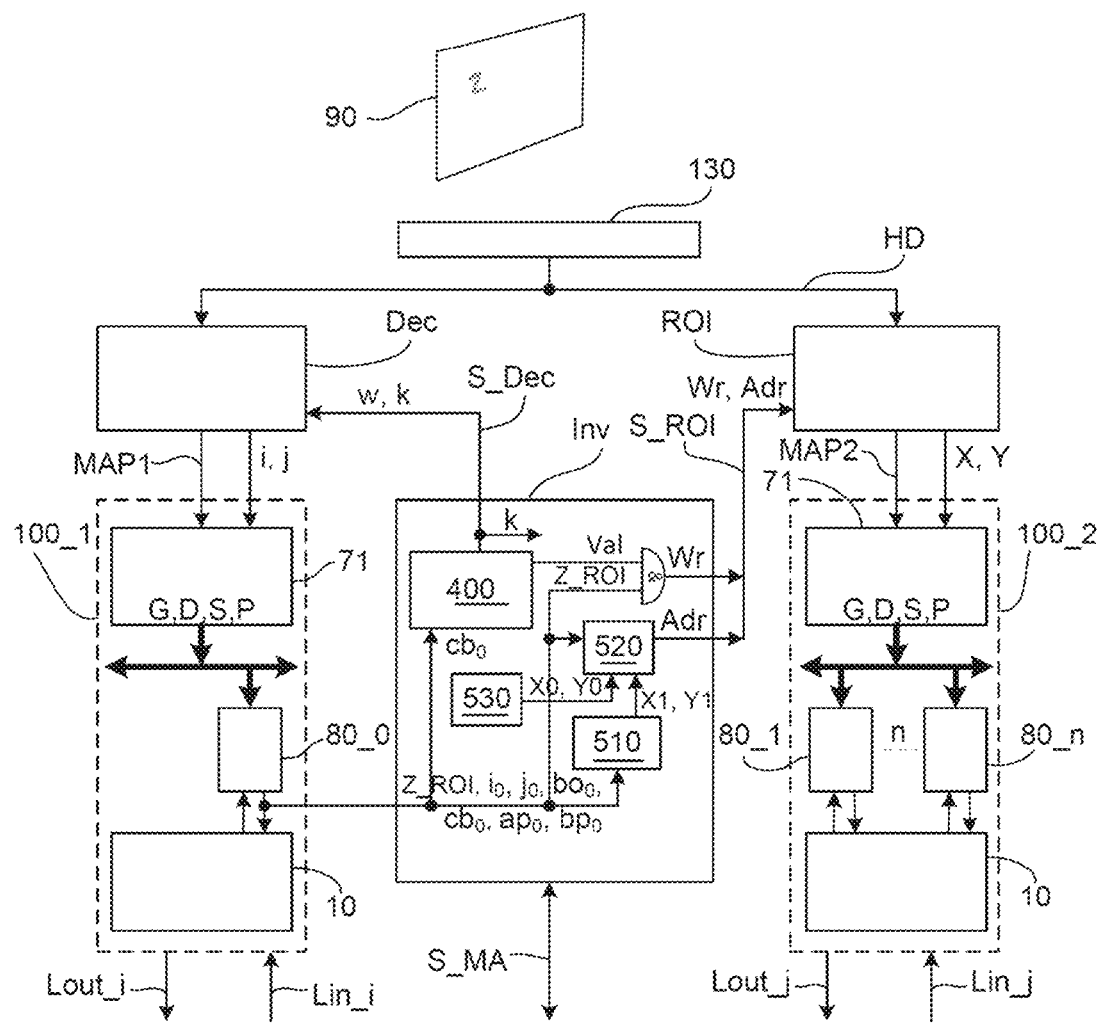
FIG. 5 illustrates use of a vision device integrating two, one context and one local, units for semantic representation of a label (100), in relation with an associative memory (10)

FIG. 5 is a generic device for achieving perceptual invariance using a single very-high-resolution large-field camera that outputs an HD signal. This is an extension and generalization of the device illustrated in FIG. 2.

The identical part.

Same event (90), same linguistic translator (130) with the same stream (HD) linked to the decimating unit (Dec) and the unit (ROI), both of which are controlled by the invariance-computing unit (Inv).

The extension.

Figure 6:
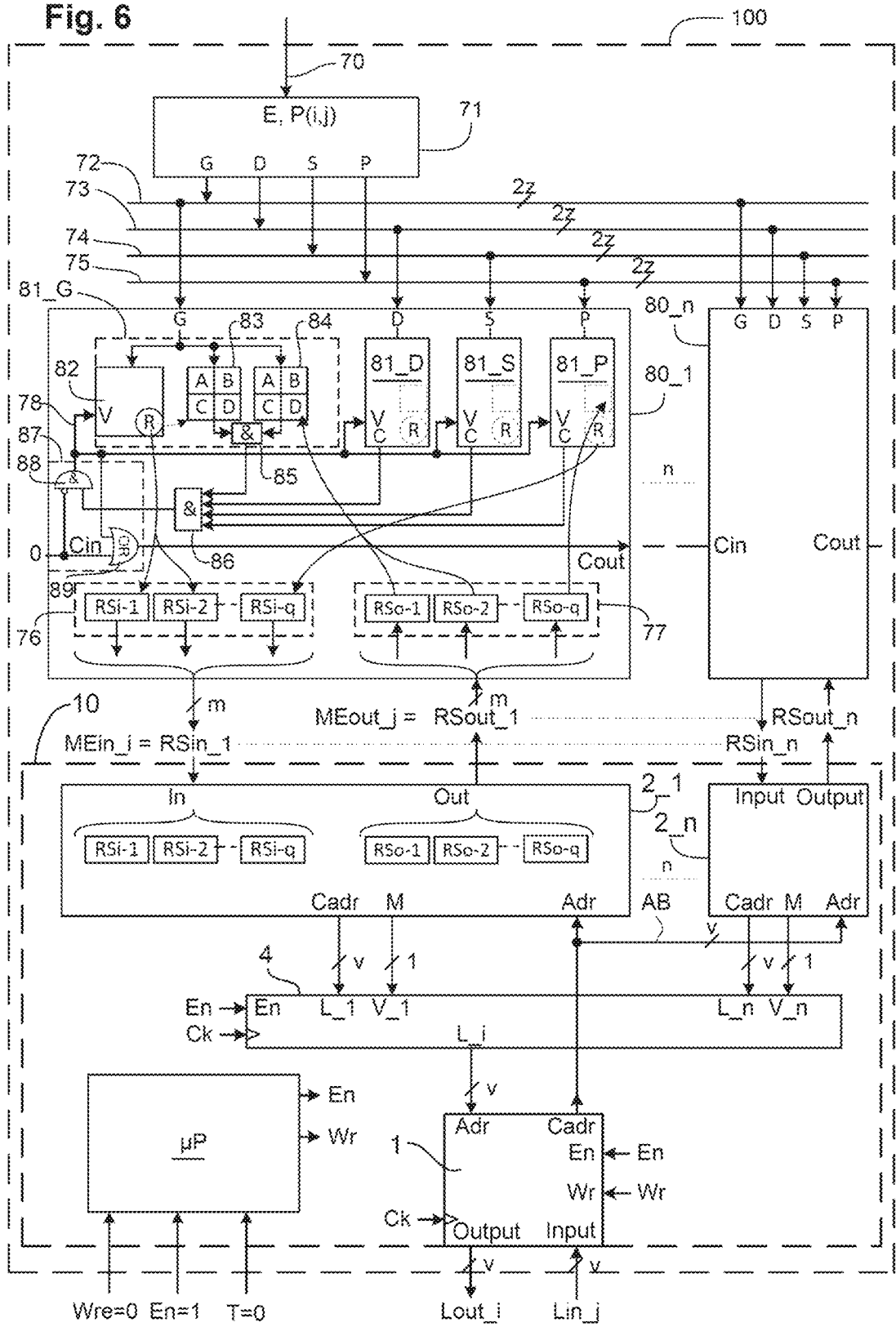
FIG. 6 shows an example of a unit for semantically representing a label (100) based on an associative memory (10) in combination with dynamic-attractor units (80_*i*) associated with a linguistic-translation-transferring unit (71)

The generic semantically representing unit (100_0), shown in detail in FIG. 6, receives, as input, the signal $MAP1_{(ijt)}$, its position (i,j) and incorporates an associative-memory unit (10) in association with:
- a linguistic-translation-transferring unit (71) that includes the unit (71') and is extended to global and dynamic perception, shown in detail in FIG. 7a, and
- a dynamic-attractor unit (80_0) that includes, in the illustration given in FIG. 2,
  - two statistical processing units—(81_G) for what is called a global perception, and (81_D) for what is called a dynamic perception—shown in detail in FIG. 6, and
  - a classifier (84) in each statistical processing unit.

This generic semantically representing unit (100_0) delivers, at the end of the moment T, the information to the invariance-computing unit as described above with reference to FIG. 2 and to an associative-memory unit while appending thereto complementary information on global and dynamic elementary semantic representations, all of these representations together forming a message that is read by the associative memory (10), a label value (Lout_i) being delivered thereby. Conversely, this label value may be reintroduced into the same associative memory (10) by way of value Lin_i, the output of this memory then delivering a message, which will have been learned beforehand, that controls the classifiers (84) with a view to confirming the acquired information.

The generic semantically representing unit (100_1) receives, as input, the signal $MAP2_{(XYt)}$, its position (X,Y) and, possessing n dynamic-attractor units, delivers up to n sub-messages to an associative memory (10) that deduces therefrom, if already known, a label (Lout_j). As described above, an inverse function, which introduces the label (Lin_j) into the associative memory (10) of the unit (100_2), controls the classifiers (84) with a view to confirming the acquired information.

FIG. 6 illustrates an example of use of the associative memory (10) in combination with dynamic-attractor units (80_i) and with a linguistic-translation-transferring unit (71) that defines the unit (100) for semantically representing a label. For greater clarity, the sequencing signals have been omitted.

The linguistic-translation-transferring unit (71).

Spatial-temporal data (70) generated by an upstream element (receiver (92)) or processing results from an associative-memory unit (10) (not shown here) are delivered to the input port (E, P(i,j)) of a linguistic-translation-transferring unit (71) that in turn delivers, synchronously, at a rate set by a clock signal (Ck), position-referenced elementary semantic representations to its output ports (G), (D), (S), and (P). Each output port (G), (D), (S) and (P) is independently connected to the bus G (72), the bus D (73), the bus S (74) and the bus P (75), respectively, all of which are of identical 2z-bit size. The n dynamic-attractor units (80_1) to (80_n) are connected to these four buses, via an input port (G), (D), (S) and (P), respectively.

The dynamic-attractor unit (80_1) Since all the dynamic-attractor units (80_1) to (80_n) are of identical design, only the dynamic-attractor unit (80_1) is described in more detail, with a view to giving an explanation of the operation thereof. This dynamic-attractor unit (80_1) includes:
four identical statistical processing units (81_G), (81_D), (81_S), and (81_P). Each statistical processing unit (81_x) comprises:
- a unit for computing a bilinear histogram (82), comprising an input datum (x) corresponding to (G) or (D) or (S) or (P) depending on the statistical processing unit (81_x),
- a result-register unit (R),
- an input (V) for validating the bilinear-histogram computation, and
- a unit (not shown here) for sequencing, depending on the operating mode, either by sequence or by number of events, that ensures, cyclically in sequence, the initialization phase, the histogram-computation phase, the phase of register (R) update and the automatic classification phase.

The initialization phase consists in zeroing the memory for storing the histogram computations and in initializing the various computation registers.

During the histogram-computation phase, to each presented datum (x) corresponds an input signal (V) that validates or not the computation.

At the end of the sequence or once the maximum value of the histogram exceeds an externally parameterized threshold that depends on the mode used, the registers (R) and the registers of the automatic classifying unit (83) are brought up to date. The computed values are the computation number (NBPTS), the median (Med), the value of the maximum (RMAX), its position (PosRMX) and the classification limits (A), (B), (C), and (D).
- two classifying units, one automatic (83) and one request-based (84), each receive data coded over 2z bits from the input port (x) and each deliver a valid classification binary signal for the z most significant bits comprised between its classification limits (A) and (B) and for the z least significant bits comprised between its classification limits (C) and (D),
- a Boolean classification-validating unit (85) receives the binary classification signals from the two, automatic and request-based, classifying units (83, 84). The result of the AND logic operation performed on these two binary classification signals is transmitted out of the statistical processing unit (81_x).

A Boolean spatially-temporally classifying unit (86) receives the binary classification signals from the four statistical processing units (81_G), (81_D), (81_S) and (81_P) in order to perform thereon an AND logic operation the result of which is transmitted to the histogram-computation-validating unit (87).

A histogram-computation-validating unit (87) comprises an AND logic unit with two inputs one of which (88) is inverted and an OR logic unit with two inputs (89). The AND logic unit (88) receives the binary signal output from the AND logic unit (86) directly and inverts the input binary signal (Cin) of the unit (80_1) and delivers a binary histogram-computation-validation signal to the input (V) of each statistical processing unit (81_G), (81_D), (81_S) and (81_P).

The OR logic unit (89) receives the input binary signal (Cin) of the unit (80_1) and the binary histogram-computation-validation signal from the AND logic unit (88) and delivers a binary inhibition signal to the output port (Cout) of the unit (80_1).

An output-register unit (76) comprises the registers (RSi-1) to (RSi-q), which are updated each time the value (NBPTS) exceeds an externally parameterized threshold. The order of the registers (RSi-1) to (RSi-p) corresponds to the median values (Med$_1$, Med$_2$) and to the classification range (P$_1$, P$_2$) defined by the difference between the classification limits ((B) minus (A) and (D) minus (C)) for each statistical processing unit (81_G), (81_D), (81_S) and (81_P). Namely, for (RSi-1) and (RSi-2), the medians (MedG$_1$, MedG$_2$) of the global mode and their respective ranges (PG$_1$, PG$_2$), respectively, and likewise for the dynamic mode and structural mode, and their position, (MedP$_1$, MedP$_2$) corresponding to the energy centroid and (PP$_1$, PP$_2$) to its extent. In this example, the output-register unit (76) comprises registers (RSi-1) to (RSi-8). In general, a certain number of registers (RSi-x) are not exploited because they are irrelevant. For example, the visual perception of a text possesses a uniform global mode (same colors and no movement), only the structural aspect provides relevant information, this decreasing the eight starting registers to three: centroid, dimension and structure.

An input-register unit (77) comprises registers (RSo-1) to (RSo-q) having the same organization as that of the output-register unit (76). Namely, for (RSo-1) and (RSo-2) respectively the medians (MedG$_1$, MedG$_2$) of the global mode and their respective ranges (PG$_1$, PG$_2$), which are transformed into classification limits (A), (B), (C), (D) such that the limit (A) is equal to (MedG$_1$)−(PG$_1$/2), the limit (B) to (MedG$_2$)+(PG$_2$/2), and likewise for the limits (C) and (D) in the same order. These classification limits (A), (B), (C), (D) are written to the request-based classifying unit (84). The same operation is repeated for the other request-based classifying units (84) of the units (81_D), (81_S) and (81_P). For information containing z bits more than four bits, it is preferable to extend the classification range by decreasing the lower classification limit by a value of 1 to 2 bits and by increasing the upper classification limit by a value of 1 to 2 bits in order to enlarge the request.

The associative memory (10)

The associative-memory unit (10), illustrated in the preceding figures, in its generic implementation, has as interface with the dynamic-attractor units (80_1) to (80_n) the message (MEin_i), which is formed from n sub-messages (RSin_1) to (RSin_n), and the message (MEout_j), which is formed from n sub-messages (RSout_1) to (RSout_n).

The sub-message (RSin_1) is transmitted from the output-register unit (76) of the dynamic-attractor unit (80_1) to the input port (In) of the memory sub-unit (2_1) of the associative-memory unit (10). Likewise, the sub-message (RSin_2) is transmitted from the output-register unit (76) of the dynamic-attractor unit (80_2) to the input port (In) of the memory sub-unit (1_2) of the associative-memory unit (10), and the transmission continues in the same order up to the rank n.

Conversely, the sub-message (RSout_1) is transmitted from the output port (Out) of the memory sub-unit (2_1) of the associative-memory unit (10) to the input-register unit (77) of the dynamic-attractor unit (80_1). Likewise, the sub-message (RSout_2) is transmitted from the output port (Out) of the memory sub-unit (1_2) of the associative-memory unit (10) to the input-register unit (77) of the dynamic-attractor unit (80_2), and the transmission continues in the same order up to the rank n.

The associative-memory unit (10) comprises:
a first assembly composed of n memory sub-units, each composed of $2^m$ words of m bits, said sub-units being referenced (2_1) to (2_n) and each receiving, via their input ports (In) respectively the sub-message (RSin_1) for the memory sub-unit (2_1) to sub-message (RSin_n) for the memory sub-unit (2_n),
a second assembly composed of a memory sub-unit of $2^v$ words of v bits (1) that receives, via the input port (In), the label (Lin_j), and
a unit (4) for computing maximum likelihood in order to select the most represented value r, s, etc. This unit (4) receives, from the output port (Cadr) of each memory sub-unit (2_1) to (2_n), a value r, or otherwise s, respectively via an input port (L_i) to (L_n) with their respective binary validation signal via the input (V_1) to (V_n), respectively. Internal sequencing is assured via a clock signal (CK) introduced into the unit (4). The choice of the maximum likelihood is positioned on the output port (L_i), a bus of v bits transmitting this value to the input port (Adr) of the memory sub-unit (1), which delivers, via its output port (Out), the value of the label (Lout_i).

In the label-to-message direction, the arrival of (Lin_j) at the input port (In) of the memory sub-unit (1) causes the value j to be delivered to its output port (Cadr), this value j being transmitted to the bus (AB) through a link-value choosing unit (10) and fed to all the memory sub-units (2_1) to (2_n), which each deliver, via their respective output ports (Out), the respective sub-messages (RSout_1) to (RSout_n) that together form the message (MEout_j).

In the opposite direction, i.e. the message-to-label direction, the sub-messages (RSin_1) to (RSin_n), corresponding to the message (MEin_i), are respectively fed to the input port (In) of each memory sub-unit (2_1) to (2_n), which each deliver a value r, etc. to their respective output ports (Cadr) in association with a binary validation signal that is delivered, via the output (M) of the same memory sub-unit. In the case where the fed sub-message is absent from the memory sub-unit, the latter delivers, to its output (M), a binary invalidation signal, the value present on its output port (Cadr) then being ignored.

Decomposition of the messages.

Each received message (MEin) of n.m bits is composed of n sub-messages (RSin_x) of m bits, x varying from 1 to n. Likewise, each message (MEout) of n.m bits delivered by the associative memory is composed of n sub-messages (RSout_x) of m bits, x varying from 1 to n.

Each sub-message is segmented into q input elements (RSi_x) or output elements (RSo_x) of z bits corresponding to m/q bits the rank of the element of which corresponds to a notion of position, dimensions and characterization.

The position is defined by its coordinate system (Ref), which generally varies from one to three, and is often equal to two for a pair of elements, for example x and y representing a relationship between two distances in the coordinate system (Ref), or t and f representing a relationship between time and frequency in the coordinate system (Ref). Generally, it is the position of the centroid of the point cloud representing the above characterization, i.e. as defined by the elements of the sub-message.

The dimensions characterize the extent of the point cloud, generally its size, therefore one element (RSi_x), for each of the axes of the coordinate system (Ref).

The characterization is generally an elementary semantic representation of one of the following types:
- Global: by way of nonlimiting example, a color is defined by a hue and a saturation, a child channel is defined by a fundamental, etc.
- Dynamic: by way of nonlimiting example, a movement is defined by its speed and its orientation, the same goes for the prosody of a voice, etc.
- Structural: by way of nonlimiting example, an edge is defined by its orientation and its curvature, a phoneme is defined by the distribution of its formants over time, etc.

The label is composed of a word of v bits, the quantity of labels storable in memory is $2^v-1$, the label "zero" being excluded.

The definition of the label is given by the input message, which may be incomplete and/or erroneous, this making it difficult to find the label. The use of a ternary mode on certain elements (RSi_x), corresponding to masking of a bit field applied to one portion of the input message (17) of (RSin_i), allows this problem to be solved.

Figure 7:
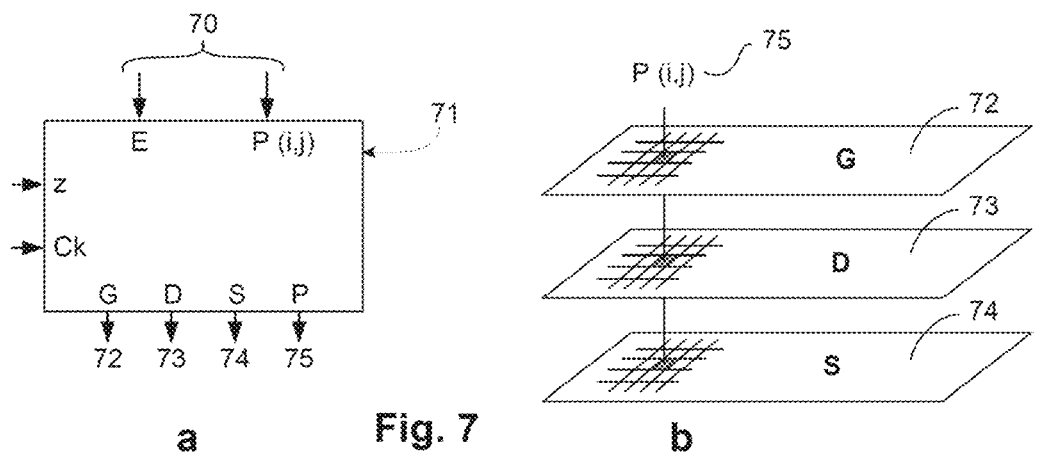
FIGS. 7*a* and 7*b* are illustrations of the transfer function of the linguistically translating unit (71)

FIG. 7-a explains the operation of the linguistic-translation-transferring unit (71) on the basis of spatial-temporal data (70) (temporal data E and position data P(i,j)) generated by an external sensor (not shown). Each spatial-temporal datum (70) input into this unit (71) is linguistically translated and delivered to four output ports, synchronously via a signal (Ck), in three distinct elementary semantic representations (G), (D), (S), positioned at (P). Each output port (G), (D), (S), and (P) is independently and respectively connected to the bus G (72), the bus D (73), the bus S (74) and the bus P (75).

FIG. 7-b is a schematic representation showing the registration of the various data (G), (D), (S), and (P). The input datum is shown in its output global mode (G), its output dynamic mode (D) and its output structural mode (S), and in position (i,j), which is determined by the datum (P), in three registered planes in 2D mode. The position (P) is expressed as a function of the dimension of its basis. The latter is generally 2D for visual data (x, y) and auditory data (t, f), but it may of course be 3D or reduced to 1D, higher dimensions are possible, the feasibility of their use depending on the size of the allocated memory.

Figure 8:
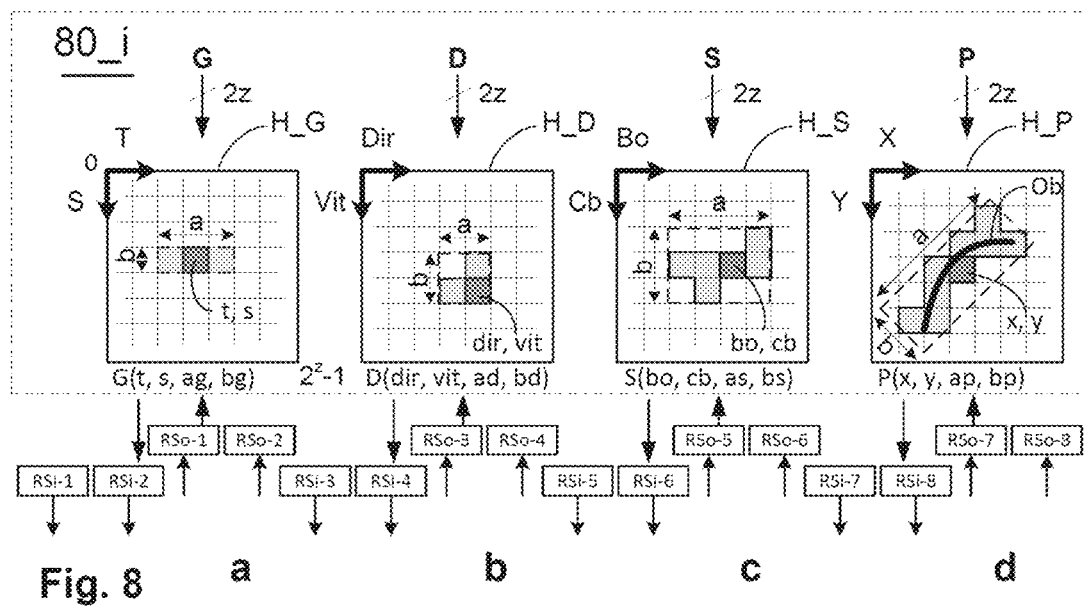
FIGS. 8*a* to 8*d* are illustrations of the organization of the computations of bilinear histograms of the dynamic-attractor unit (80_*i*)

FIG. 8 illustrates the organization of the results of the computations of the four bilinear histograms of the dynamic-attractor unit (80_i) on the basis of the data (G), (D), (S), and (P) of 2z bits output from the linguistic-translation-transferring unit (71). The input datum processed in this example is of 2D-vision type. The unit (71) linguistically translates this datum into:
- a global representation (G): along two axes, hue (T) and saturation (S). Histogram (H_G) over $2^{2z}$ values, FIG. 8a.
- a dynamic representation (D): along two axes, direction (Dir) and speed of movement (Vit). Histogram (H_D) over $2^{2z}$ values, FIG. 8b.
- a structural representation (G): along two axes, oriented edge (Bo) and curvature (Cb). Histogram (H_S) over $2^{2z}$ values, FIG. 8c.
- a positionwise representation (P): along two axes (X) and (Y). Histogram (H_P) over $2^{2z}$ values, FIG. 8d.

Each input datum is coded into a word of 2z bits giving a $2^z \times 2^z$ matrix representation of the histogram computation, the first z bits representing one axis and the remaining z bits the second axis of the matrix.

To illustrate the perceptual method of representing elementary semantic representations, the representation in position (P) of one edge segment of an object (Ob) is shown in FIG. 8d, values shaded gray corresponding to the classified results (classified by the classifying unit (83)) of the bilinear-histogram computation of the matrix (H_P). The result of this histogram computation is transmitted to the output-register unit (76), the value thereof being its positionwise centroid of 2z bits (x, y) and its dimensional range of 2z bits (ap, bp).

The perceived orientation and local curvature of the object (Ob) (FIG. 8c) is delivered by the bilinear-histogram computation (H_S) the result of the computation of which is transmitted to the output-register unit (76) with, as value, its centroid, and therefore its semantic orientation and curvature representation of 2z bits (bo, cb) and its tolerance of 2z bits (as, bs).

FIG. 8a indicates, via the result of the bilinear-histogram computation (H_G), the dominant color of the portion of the object (Ob) which is represented by its hue and saturation value of 2z bits (t, s) with its tolerance value of 2z bits (ag, bg), which is transmitted to the output-register unit (76).

Likewise, FIG. 8b indicates, via the result of the bilinear-histogram computation (H_D), the local movement of the portion of the object (Ob) which is represented by its direction-of-movement value and its speed over 2z bits (dir, vit) with its tolerance value of 2z bits (ad, bd), which is transmitted to the output-register unit (76).

Conversely, the input-register unit (77) brings up to date, in the same order, the classification limits of the request-based classifying units (84) of each statistical processing unit (81_G), (81_D), (81_S), and (81_P).

This perceptual method ensures an automatic control between the perceived data, which are represented and interpreted by way of a learnt label.

In this example application, the input sub-message (RSin_x) of the associative memory (10) is composed of the results (t, s, ag, bg) for the sub-message (RSi-1) and (RSi-2), (dir, vit, ad, bd) for the sub-messages (RSi-3) and (RSi-4), (bo, cb, as, bs) for the sub messages (RSi-5) and (RSi-6), and (x, y, ap, bp) for the sub-messages (RSi-7) and (RSi-8). Likewise for the output sub-message (RSout_x) of the associative memory (10).

This sub-message (RSin_x) is a global, dynamic or structural elementary semantic representation (response to the question what?) for a position (response to the question where?). The n sub-messages (RSin_x), x varying from 1 to n, define the message MEin_i representing, as output from the associative memory (10), the label (Lout_i).

FIG. 5 shows an application using visual perceptual invariance with extraction of elementary semantic representations stored in an associative memory (10).

A scene (110) comprising a symbol, in the present case a numeral two written on a planar surface, is perceived by a camera (120) placed facing, which delivers a high-density video signal (HD), for example a 20 Mp (megapixel) signal at 50 fps (50 images of 20 million pixels per second).

This signal (HD) is delivered conjointly to:
- a decimating unit (Dec) that transforms by spatial decimation this signal (HD) into a low-resolution signal (MAP1) representing the same viewpoint, for example a VGA format of 0.3 Mp and of same image frequency 50 fps, and
- a unit for extracting region of interest (ROI), which cuts this signal (HD) into a signal (MAP2) of same spatial resolution in a range corresponding to $X_1=k.ap_0$ and $Y_1=k.bp_0$ and transmits it at the same image frequency (50 fps) or at a multiple of the image frequency, 8 times for example.

Figure 9:
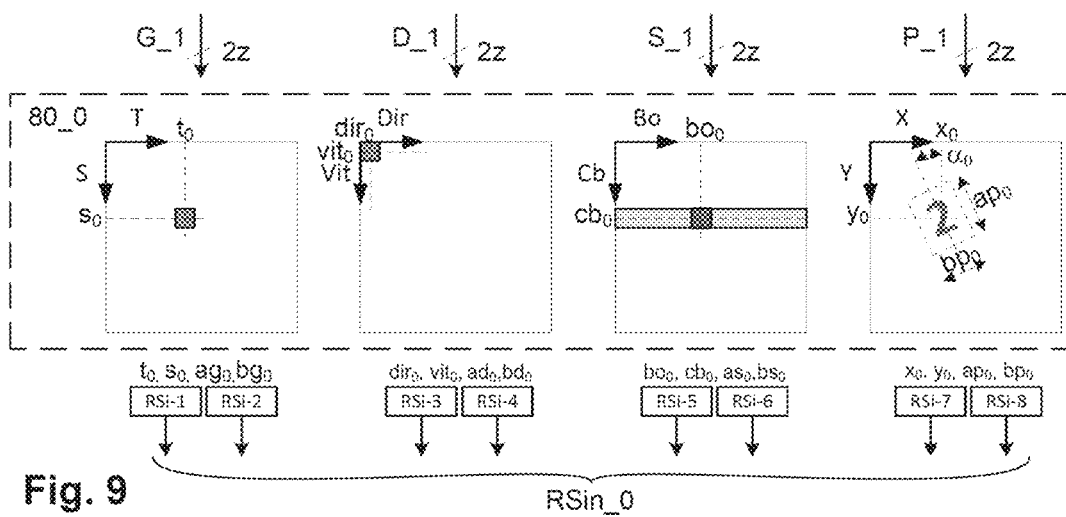
FIG. 9 is an illustration of the extraction, by a dynamic attractor (80_0), of the contextual semantic representations of an element perceived by the vision device of FIG. 5.

The video signal (MAP1) is introduced into a generic semantically representing unit (100_1) that perceives the written symbol as a mark. The dynamic attractor (80_0) of this unit (100_1), see FIG. 9, delivers the elementary semantic representations, which are of the following types:

Global (G_1): words of 2z bits transformed into an elementary semantic representation of color—hue and saturation centroid ($t_0$, $s_0$) and range of distribution of the data along the two axes T and S ($ag_0$, $bg_0$) corresponding to the sub-messages (RSin-1) and (RSin-2), respectively.

Dynamic (D_1): words of 2z bits transformed into an elementary semantic representation of movement—direction and speed-of-movement centroid ($dir_0$, $vit_0$) and range of distribution of the data along the two axes Dir and Vit ($ad_0$, $bd_0$) corresponding to the sub-messages (RSin-3) and (RSin-4), respectively.

Structural (S_1): words of 2z bits transformed into an elementary semantic representation of shape—oriented-edge and curvature centroid ($bo_0$, $cb_0$) and range of distribution of the data along the two axes Bo and Cb ($as_0$, $bs_0$) corresponding to the sub-messages (RSin-5) and (RSin-6), respectively.

Position (P_1): words of 2z bits transformed into an elementary semantic representation of position—X and Y position centroid ($x_0$, $y_0$) and range of distribution of the data along the two axes X and Y ($ap_0$, $bp_0$), oriented by an angle $\alpha 0$ equal to the value $bo_0$, corresponding to the sub-messages (RSin-7) and (RSin-8), respectively.

Together all of the elements (RSin_1) to (RSin-8) form the sub-message (RSin_0). This message gives a semantic representation of the perceived element in its entirety, in this example the element is of color ($t_0$, $s_0$), immobile ($ad_0$, $bd_0$)=0,0, centered on ($x_0$, $y_0$), oriented by an angle $bo_0$, and of size ($k.ap_0$, $k.bp_0$). This is a contextual representation.

The invariance-computing unit (Inv) reads, through the communication bus (S_MA), the oriented-edge and curvature information ($bo_0$, $cb_0$) and computes the filtering coefficient w and the decimation coefficient k, which are transmitted to the unit (Dec). This loop dynamically adapts the decimation of the signal (HD) to (MAP1) in order to keep the result $cb_0$ between the two limits La and Lb, sets the flag Val to one and triggers the computation of the invariant stream (MAP2), of dimension $2^z \times 2^z$, equal to:

A geometric translation of the center point $x_0=k.i_0$ and $y_0 \equiv_0 k.j_0$ in the coordinate system (HD)

A rotation, at this center point, of the coordinates by an angle equal to $bo_0$ A homothetic transformation corresponding to the largest dimension of the region of interest of the dynamic attractor ($ap_0$) or ($bp_0$) multiplied by the value of the decimation coefficient (k) and scaled by the validation of the first z bits of the preceding result.

Once this convergence has stabilized, signaled by the flag Val being set to 1, the rest of the moments T employ dynamic attractors recruited by dynamic recruitment in order to obtain, for the region of interest (ROI) thus located, at the end of the moment T, a structural semantic representation, while inhibiting the information of the main zones located beforehand so as to locate other regions of interest inside a zone of the uninhibited square space of 2z side length. This image zone, which is referenced positionwise (MAP2$_{(x,y)}$), forms the video signal (MAP2) that is introduced into a generic semantically representing unit (100_2) in order to perceive the written symbol in its entirety. The dynamic attractors (80_1), (80_2), and (80_3) of this unit (100_2), see FIG. 1, each deliver structural elementary semantic representations and positions, in decreasing order of number of pixels perceived in the video frame. In this example, the curvature of the numeral two comprises the highest number of perceived pixels and is therefore represented by the dynamic attractor (80_1), which delivers an m-bit sub-message (Rsin_1) composed of the oriented-edge and associated-curvature elements ($bo_1$, $cb_1$) of 2z bits, of position elements ($x_1$, $y_1$) of 2z bits, of dimension elements ($ap_1$, $bp_1$) of $2^z$ bits and of an orientation element $\alpha_1$ equal to $bo_1$. The dynamic recruitment of a second dynamic attractor (80_2), which receives the inhibition of the preceding processing operation, perceives the highest number of pixels as corresponding to the horizontal portion of the numeral two and delivers an m-bit sub-message (Rsin_2) composed of the oriented-edge and associated-curvature elements ($bo_2$, $cb_2$) of $2^z$ bits, of position elements ($x_2$, $y_2$) of 2z bits, of dimension elements ($ap_2$, $bp_2$) of $2^z$ bits and of an orientation element $\alpha_2$ equal to $bo_2$. The sequence continues with the dynamic recruitment of a third dynamic attractor (80_3), which receives the inhibition of the preceding processing operations, perceives the highest number of pixels as corresponding to the oblique portion of the numeral two and delivers an m-bit sub-message (Rsin_3) composed of the oriented-edge and associated-curvature elements ($bo_3$, $cb_3$) of 2z bits, of position elements ($x_3$, $y_3$) of 2z bits, of dimension elements ($ap_3$, $bp_1$) of 2z bits and of an orientation element $\alpha_3$ equal to $bo_3$. The remaining number of unprocessed pixels being lower than a qualification threshold (value of NBPTS lower than a threshold), the sequence of recruitment of new dynamic attractors stops.

The message (MEin_i) is composed of the sub-messages (RSin_1), (RSin_2), and (RSin_3), i.e. a combination of 3 words of 6z bits. For a low precision of 6%, input datum value z coded over 4 bits, $2^{6z}$ equals $2^{24}$, i.e. almost 16 million values, and the combinational for n=3 and ME=16× $10^6$ is:

$$C_{ME}^n = \frac{ME!}{(w-n)! \cdot n!} \simeq \frac{ME^n}{n!} = \frac{(16 \times 10^6)^3}{6} \simeq 6.8 \times 10^{20}$$

This message (MEin_i) is associated with the label (Lin_i) "two", in this case, and is stored in the associative memory (10) of the semantically representing unit (100_2).

The sequencing unit (Sec) controls, through communication buses (S_P2) between the unit (100_2) for semantically representing a label and the sequencer (Sec) and (S_MA) between the associative-memory unit (10) and the sequencer (Sec), the organization of the perceived messages.

An associative memory (10) associates the label (Lout_j) output from the unit (100_1) and the label (Lout_i) output from the unit (100_2) in order to output a label (Lout_k) corresponding to the value of the numeral "two" in its context. For example, this device makes it possible to validate the numeral "one" contextually positioned to the right of the numeral "two" perceived beforehand in order to form the number "twenty-one".

From an application point of view, the illustration of the automatic device for computing perceptual invariance of an event illustrated in FIG. 5 may advantageously be integrated into an electronic module and be used to intelligently control an effector (97) on the basis of signals output by a transducer (130), in the field of the Internet of Things.

REFERENCE NUMBERS AND SYMBOLS 1 associative-memory sub-unit of $2^v$ words of v bits
2_*i* associative-memory sub-unit (i) of $2^v$ words of m bits
4 unit for selecting maximum likelihood
10 associative-memory unit
70 input spatial-temporal data
71 linguistic-translation-transferring unit
71' simplified linguistic-translation-transferring unit
72 G bus
73 D bus
74 S bus
75 P bus
76 output-register unit
77 input-register unit
78 binary histogram-computation-validation signal
80 dynamic-attractor unit
81_G, 81_D, 81_S, and 81_P statistical processing units
82 bilinear-histogram-computing unit
83 automatic classifying units
84 request-based classifying units
85 Boolean AND unit with two classification-validation inputs
86 Boolean AND unit with four spatial-temporal-classification inputs
87 histogram-computation-validating unit
88 Boolean AND unit with one inverted input
89 Boolean OR unit
90 element of a scene
100 unit for semantically representing a label
110 perceived scene
120 vision sensor
130 linguistic data translator
150 unit for sequencing input data
200 unit for performing a Gaussian filtering operation of factor w
300 unit for performing a decimation of factor k
400 unit for computing the filtering and decimation factors w and k
520 units for multiplexing addresses
530 unit for sequencing invariant data
540 unit for truncating a bits to the z most significant bits
541 unit for truncating the o/k or p/k most significant bits to the z most significant bits
542 unit for truncating the largest of $k.ap_0$ or $k.bp_0$ to the z most significant bits
550 Boolean AND unit
600 buffer memory unit
$A_{xyt}$ binary number of a bits
AB common bus of v bits
Adr memory address input port
Cadr address output port for the memory content selected by the input port (In) of the sub-units (2_1) to (2_*n*) and (1)
Cin dynamic inhibition input command
Cout dynamic inhibition output command
Ck sequencing clock
Cor command-signal input for the correction of the input message (RSin_i)
Cpt output port of the accounting unit (3) Cpt[v-1:0] binary output value of the counting unit (3)
D dynamic elementary semantic representation
Dec decimating unit
E data input of the unit (71)
En validation input function of the associative-memory sub-units (1_*i*) and (1)
G global elementary semantic representation
HD video stream of high spatial definition
i,j MAP1 coordinate system
In input port of the memory sub-units (2_1) to (2_*n*) and (1)
Inv invariance-computing unit
L_i link value between the memories (1) and (1)
Lout_i label as output
Lin_j label as input
m dimension of the message
M output signal validating the binary value of the associated output port (Cadr)
MA, MB, MC, MD, ME input and output messages
MAP1 decimated video stream
MAP2 ROI video stream
MEin_i input message containing n sub-messages (RSin_1) to (RSin_n)
MEout_j output message containing n sub-messages (RSout_1) to (RSout_n)
n number of input or output sub-messages (RSin_i) or (RSout_i)
Ob edge segment of an object
Out output port of the memory sub-units (2_1) to (2_*n*) and (1)
P position of the elementary semantic representations G, D and S
q number of elements forming a sub-message
ROI region of interest of the data
S structural elementary semantic representation
S_ROI bus for communication between the unit (Inv) and the region of interest
S_Dec bus for communication between the unit (Inv) and the decimation of the data
S_MA bus for communication between the unit (Inv) and the associative memory
S_P1 bus for communication between the unit (Inv) and the semantically representing unit 1
S_P2 bus for communication between the unit (Inv) and the semantically representing unit 2
Sec sequencer of the semantically representing unit
Wr signal for controlling the write to the memory sub-units (1) and (1)
Wre input signal for selecting the associative-memory unit (10) to be written to
RSi_x element of the input sub-message RSin_i of z bits
RSo-x element of the output sub-message RSout_i of z bits
RSin_i sub-message (i) in memory input
RSout_i sub-message (i) in memory output
X,Y invariant coordinate system
X0,Y0 coordinate system
X1,Y1 coordinate system
V_i input for validation of the value of (L_i)
w Gaussian matrix parameter
Wr memory write control signal
/1 binary signal of 1 bit
/a number of bits of the binary number $A_{xyt}$
/v binary signal bus of v bits
/z binary signal bus of z bits

The invention claimed is:
1. A signal-processing circuit for extracting from a signal a semantic representation, said circuit being configured to carry out:
an iterative computation of a factor k of change of spatial scale and of decimation of said signal, said iterative computation being parameterized in order to keep constant a median curvature value of an oriented edge between two limits chosen in a region of interest selected in a window of said signal;

an application of change-of-frame operations to the coordinates of said region of interest in order to transform said coordinates into a coordinate system of elementary semantic representations;

said processing circuit furthermore being configured to apply to the factor k a homothetic ratio determining a spatial-temporal window depending on a number z of most significant bits of the signal in the region of interest during a period T, said spatial-temporal window being suitable for carrying out comparisons with elementary semantic representations stored in a memory connected to the processing circuit.

2. The signal-processing circuit as claimed in claim 1, wherein the iterative computation of the factor k comprises an elementary extraction of oriented edges and of curvatures of the signal transformed to the scale 1/k.

3. The signal-processing circuit as claimed in claim 2, wherein the iterative computation of the factor k furthermore comprises a computation of a looped bilinear spatial-temporal histogram delivering as output, for the region of interest, a median oriented-edge value, a value of the curvature of said oriented edge, a centroid value of a point cloud defined by the points of the decimated signal in the region of interest, and values of the dimensions of the limits of said cloud.

4. The signal-processing circuit as claimed in claim 3, wherein the change-of-frame operations comprise a geometric origin translation to the centroid of the point cloud after change of scale.

5. The signal-processing circuit as claimed in claim 4, wherein the homothetic ratio is equal to a power of 1/2, said power being equal to the number of least significant bits between the limits of the cloud of the scaled signal in the coordinate system of elementary semantic representations.

6. The signal-processing circuit as claimed in claim 1, wherein the change-of-frame operations comprise a rotation by an angle equal to that of the oriented edge with an origin axis of the coordinate system of the elementary semantic representations.

7. The signal-processing circuit as claimed in claim 1, furthermore configured to compute the factor k of change of scale at the output of a Gaussian filtering operation the matrix of which is defined by a parameter w, said parameter being related to the factor k by an affine relationship.

8. The signal-processing circuit as claimed in claim 7, wherein the affine relationship is such that $k=0.81w+1.09$.

9. A device for extracting perceptual invariants from a signal, comprising one or more:
   linguistic translators of said signal;
   signal-processing circuits as claimed in claim 1;
   dynamic attractors configured to determine elementary semantic signal representations;
   associative memories that are associative via address or content, for storing/using said elementary semantic signal representations.

10. A signal-processing method for extracting from a signal a semantic representation, said method comprising:
   an iterative computation of a factor k of change of spatial scale and of decimation of said signal, said iterative computation being parameterized in order to keep constant a median curvature value of an oriented edge between two limits chosen in a region of interest selected in a window of said signal;
   an application of change-of-frame operations to the coordinates of said region of interest in order to transform said coordinates into a coordinate system of elementary semantic representations;
   an application to the factor k of a homothetic ratio determining a spatial-temporal window depending on a number z of most significant bits of the signal in the region of interest during a period T, said spatial-temporal window being suitable for carrying out comparisons with elementary semantic representations.

11. A method for extracting perceptual invariants from a signal, comprising one or more:
   acquisitions of samples of said signal;
   applications of a signal-processing method as claimed in claim 10;
   executions of dynamic-attractor processes in order to determine elementary semantic signal representations;
   accesses to one or more associative memories that are associative via address or via content, for storing/using said elementary semantic signal representations.

* * * * *